US008904386B2

(12) United States Patent
Cai et al.

(10) Patent No.: US 8,904,386 B2
(45) Date of Patent: Dec. 2, 2014

(54) RUNNING A PLURALITY OF INSTANCES OF AN APPLICATION

(75) Inventors: Jun Jie Cai, Shanghai (CN); Heng Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/419,963

(22) Filed: Mar. 14, 2012

(65) Prior Publication Data

US 2012/0254885 A1    Oct. 4, 2012

(30) Foreign Application Priority Data

Mar. 31, 2011    (CN) .......................... 2011 1 0081183

(51) Int. Cl.
*G06F 9/455*    (2006.01)
*G06F 9/46*    (2006.01)
*G06F 9/50*    (2006.01)

(52) U.S. Cl.
CPC .................................. *G06F 9/5016* (2013.01)
USPC .............................................. 718/1; 718/100

(58) Field of Classification Search
USPC ......................................... 718/104, 106, 107
See application file for complete search history.

(56) References Cited

U.S. PATENT DOCUMENTS

| 4,742,450 | A | 5/1988 | Duvall et al. |
| 6,182,170 | B1 | 1/2001 | Lee et al. |
| 6,938,247 | B2 | 8/2005 | Czajkowski |
| 7,421,698 | B2 | 9/2008 | Fresko |
| 7,426,720 | B1 | 9/2008 | Fresko |
| 7,536,525 | B2 | 5/2009 | Chandrasekaran et al. |
| 7,587,721 | B2 | 9/2009 | Schmidt et al. |
| 7,657,888 | B2 | 2/2010 | Traut et al. |
| 2002/0046230 | A1* | 4/2002 | Dieterich et al. ............. 709/107 |
| 2003/0126186 | A1* | 7/2003 | Rodgers et al. ............... 709/107 |
| 2003/0187911 | A1* | 10/2003 | Abd-El-Malek et al. ..... 709/108 |
| 2003/0191867 | A1 | 10/2003 | Czajkowski |
| 2006/0136920 | A1* | 6/2006 | Nagano et al. ................ 718/100 |
| 2010/0023943 | A1* | 1/2010 | Arthurs et al. .................... 718/1 |
| 2010/0223613 | A1 | 9/2010 | Schneider |
| 2012/0110574 | A1* | 5/2012 | Kumar ............................. 718/1 |

FOREIGN PATENT DOCUMENTS

| CN | 1196521 A | 10/1998 |
| CN | 1989489 A | 6/2007 |
| JP | 17-255173 A | 3/2007 |
| WO | 2005/114405 A2 | 12/2005 |
| WO | 2007036072 A1 | 4/2007 |

OTHER PUBLICATIONS

Kiyokuni Kawachiya, Cloneable JVM: A New Approach to Start Isolated Java Applications Faster, Jun. 15, 2007, IBM, ACM.*

(Continued)

*Primary Examiner* — Charles Swift
(74) *Attorney, Agent, or Firm* — Lee Law, PLLC; Christopher B. Lee

(57) ABSTRACT

Running of a root instance of an application is started. The root instance includes at least one thread. In response to determining that a thread of the root instance runs to a preset freezing point in the application, running of all threads of the root instance is stopped. In response to starting to run an additional instance of the application, a running state of all threads of the root instance is replicated as a running state of all threads of the additional instance of the application. Running all threads of the additional instance of the application is continued.

24 Claims, 3 Drawing Sheets

(56) References Cited

OTHER PUBLICATIONS

Derek Bruening, Process-Shared and Persistent Code Caches, Mar. 5-7, 2008, VMware, ACM.*

Godmar Back, Java Operating Systems: Design and Implementation, Aug. 1998, University of Utah, UUCS.*

Minoru Taga, Examiner/Authorized Officer, Patent Cooperation Treaty International Search Report and Written Opinion for PCT/IB2012/051044, May 22, 2012, pp. 1-7, Published by the Japan Patent Office International Searching Authority, Tokyo, Japan.

Kiyokuni Kawachiya, et al., Cloneable JVM: A New Approach to Start Isolated Java Applications Faster, Proceedings of the Third International ACM SIGPLAN/SIGOPS Conference on Virtual Execution Environments (VEE '07), Jun. 13, 2007, pp. 1-11, Association for Computing Machinery, New York, NY, USA.

Intellectual Property Office, United Kingdom, Examination Report for GB Application No. GB1318013.8, Nov. 6, 2013, pp. 1-3, Newport, South Wales, UK.

State Intellectual Property Office of the People's Republic of China, Examination Report for Chinese Application No. 201110081183.0 (English translation not available), Feb. 8, 2014, pp. 1-5, P. R. China.

* cited by examiner

RUNNING A PLURALITY OF INSTANCES OF AN APPLICATION

RELATED APPLICATIONS

This application claims priority to and claims the benefit of Chinese Patent Application Serial No. 201110081183.0 titled "RUNNING A PLURALITY OF INSTANCES OF AN APPLICATION," which was filed in the State Intellectual Property Office of the People's Republic of China on Mar. 31, 2011, and which is incorporated herein by reference in its entirety.

BACKGROUND

The present invention generally relates to the running of computer applications, and more particularly, to running a plurality of instances of an application.

Cloud computing is a burgeoning network service mode. An analysis report by the International Data Corporation (IDC) points out that among the $359 billion global information technology (IT) expenditure in 2009, $17 billion came from investment in cloud computing. Other surveys also indicate that two thirds of enterprises plan to expand the use of public clouds.

"Multi-tenancy" architecture is an architecture used in cloud computing. Multi-tenancy borrows and develops many concepts from host computing, introduces the concepts into the ecosystem of x86 platform servers, and extends the original concepts to support thousands of "tenants" within and external to enterprises. Such "tenants" may be any application in any enterprises (either within enterprises or external to enterprises), which has its own security requirements and dedicated virtual computing environment. The environment may include several or all levels of the enterprise IT architecture, from storage to user interface. Interactive applications may be multi-user or "multi-tenant" oriented in nature.

"Multi-tenancy," in brief, is that a single software instance may serve a plurality of organizations (or users). A software program supporting multi-tenancy operates, in design, to enable every organization using the software to use a separate virtual instance, and to be able to customize the virtual instance. The advantage of multi-tenancy lies in reducing overall resource consumption, as well as the cost of running an application through sharing a software instance by a plurality of organizations. In addition, since all the organizations share the same set of core code, the update and development of the software is easier. Furthermore, by using the multi-tenancy architecture, physical resources and software resources may be reduced, management may be simplified, and efficiency may be improved.

BRIEF SUMMARY

According to an aspect of the present invention, a method for running a plurality of instances of an application includes: starting to run a root instance of the application, the root instance including at least one thread; in response to determining that a thread of the root instance runs to a preset freezing point in the application, stopping running all threads of the root instance; in response to starting to run an additional instance of the application, replicating a running state of all threads of the root instance as a running state of all threads of the additional instance of the application; and continuing to run all threads of the additional instance of the application.

According to another aspect of the present invention, there is provided a system for running a plurality of instances of an application, including a memory and a processor programmed to: start to run a root instance of the application, the root instance including at least one thread; in response to determining that a thread of the root instance runs to a preset freezing point in the application, stop running all threads of the root instance; in response to start to run an additional instance of the application, replicate a running state of all threads of the root instance as a running state of all threads of the additional instance of the application; and continue to run all threads of the additional instance of the application.

According to another aspect of the present invention, there is provided a computer program product for running a plurality of instances of an application including a computer readable storage medium including computer readable program code, where the computer readable program code when executed on a computer causes the computer to: start to run a root instance of the application, the root instance comprising at least one thread; in response to determining that a thread of the root instance runs to a preset freezing point in the application, stop running all threads of the root instance; in response to starting to run an additional instance of the application, replicate a running state of all threads of the root instance as a running state of all threads of the additional instance of the application; and continue to run all threads of the additional instance of the application.

BRIEF DESCRIPTION OF THE SEVERAL VIEWS OF THE DRAWINGS

The above and other objectives, features and advantages of the present invention will become more apparent through more detailed description of the example embodiments of the present invention in the accompanying drawings, in which same reference numerals usually denote the same components in the exemplary embodiments of the present invention.

DETAILED DESCRIPTION

Figure 1:
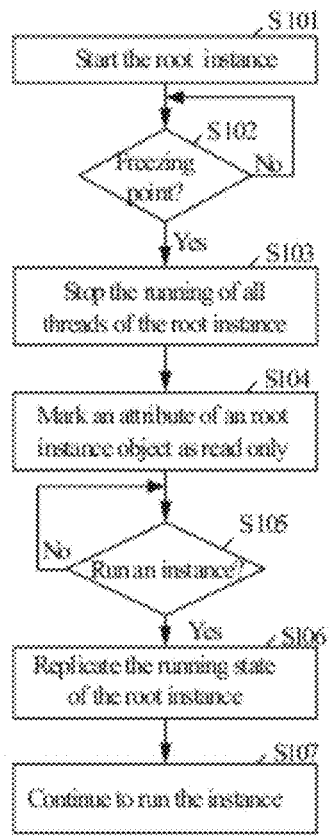
FIG. 1 illustrates an example of an implementation of a process for running a plurality of instances of an application according to an embodiment of the present subject matter.

Preferred implementations of the present subject matter will be described in more detail by referring to the accompanying drawings, in which the preferred embodiments are shown. However, the present subject matter may be implemented in various forms, and should not be understood as limited to the embodiments set forth herein. In contrast, the embodiments are provided to make the present subject matter more thorough and complete, and to convey the scope of the present invention to those skilled in the art.

It should be noted that conception of the present subject matter resulted from recognition of certain limitations associated with conventional execution of multiple instances of an application. Several of the following paragraphs detail some of the observations that resulted in conception of the present subject matter.

For example, it was observed that programmers usually call programs that are executed in the computer processes, and each process has its own separate memory space. For example, for a web browser program, each time the web browser window is opened, a web browser process is started. A thread refers to an execution flow in a process, and is sometimes also called an execution context. One process may be composed of a plurality of threads (i.e., a plurality of different threads may be run simultaneously in one process) and they may perform different tasks, respectively. When a plurality of threads in a process run simultaneously, such a running mode is called concurrent running. The major difference between a thread and a process is that each process needs the operating system to allocate a separate memory address space for it, while all threads in one process work in the same one address space, and these threads may share the same one memory and system resources (e.g., share one object or share an opened file). Existing operating systems, such as Mac OS® and Windows®, usually use the concept of multi-thread, and view a thread as a basic execution unit.

It was further observed that in the existing cloud computing environment, in order to realize the multi-tenancy architecture, for an application like the Java™ programming language, a virtual machine is replicated and another same application runs in the replicated virtual machine. The virtual machine is a process, and the replicated virtual machine process may share some memory pages with the original virtual machine process. However, memory pages are large storage units in the memory, thus the granularity of such sharing is coarse, and the saved storage space is limited.

It was further observed that in addition, in many scenarios, it is often desirable to run a plurality of instances of an application. An instance refers to one time of running of an application (e.g., running a plurality of Eclipse™ instances refers to running the Eclipse™ application multiple times); or running a plurality of instances of a Java™ programming language applications refers to running the Java™ programming language application in the Java™ virtual machine (JVM®) process multiple times. Instance is originally a virtual concept, and does not have a program entity corresponding thereto. One instance may include a plurality of threads. If a plurality of instances run in the same process, the instances may share the memory space. Each instance may include a plurality of threads, and the current multi-tenancy solutions only have replication at the virtual machine process level (i.e., processes share memory pages). However, a plurality of threads included in a plurality of instances do not have sharing between them, while the plurality of threads within the instances have similarities. Since the storage spaces of instance processes are independent and use process sharing, usually memory pages cannot be shared due to minor differences, and the coarse granularity of sharing wastes application running space.

It was also observed that in some cloud computing environments, in order to satisfy the security and isolation requirements of multiple tenants (users), the administrator of the cloud computing has to create a separate instance of the application for each user. Although a plurality of instances of the application run on the same basic code, currently it is difficult to use the same basic code, which causes unnecessary resource consumption (e.g., the memory spaces occupied due to loading the same code multiple times). In addition, in different instances of the application, the same global data structure is used, which causes repeated occupation of the data storage space, etc.

It was additionally observed that in the previously existing "multi-tenancy" architecture (e.g., for a Java™ programming language application), the problem is solved by replicating the JVM®. The method replicates the existing JVM® to re-start a new replicated JVM® and share the memory pages, and run another same Java™ programming language application in the replicated JVM®. However, this method is process-level sharing, with a coarse granularity of sharing, and has limited space saving.

Therefore, in view of the observed limitations of existing systems, the present subject matter improves execution of multiple instances of an application, as described in more detail below. The present subject matter considers that in a cloud computing environment, it may use the manner of running a plurality of application instances to realize the multi-tenancy architecture, and repeatedly performs data sharing for the plurality of instances in the application to save the space of running the application. The present subject matter provides new technology for running a plurality of instances of an application that saves storage space occupied by the application.

The present subject matter provides technology for running a plurality of instances of an application. From the description of the examples herein, it should be noted that the technology described herein is applicable for all applications using object-oriented languages and running on virtual machines, and there are many such applications (e.g., applications of the Java™ programming language which may run on a Java™ virtual machine (JVM®), applications of the Ruby language which may run on a Ruby virtual machine, and applications of the Python® language which may run on a Python® virtual machine, and applications of the C# language which may run on a C# virtual machine, etc.).

FIG. 1 illustrates an example of an implementation of a process for running a plurality of instances of an application according to an embodiment of the present subject matter. According to FIG. 1, at step S101, start to run a root instance of the application, and the root instance includes at least one thread. Here the root instance may be understood as the initial running of the application. At step S102, determine whether a thread of the root instance of the application runs to a freezing point, which will be discussed in detail in below. If not, continue to wait. If yes, at step S103, in response to determining that a thread of the root instance has run to a preset freezing point of the application, stopping running all threads of the root instance. At step S104, mark an attribute of a root instance object in the root instance as read only, which may prevent a subsequent write operation from modifying the root instance object. In fact, as may be seen from the subsequent processing of the method, when a write operation is concerned, there is no operation of directly modifying a field of the root instance object. Therefore, such marking is for preventing mis-operation, and is a preferred implementation. At step S105, determine whether to run all threads of an instance of the application, and here an instance is understood as the second, third, etc. running of the application (i.e., a non-initial running of the application). If not, continue to wait. If yes, at step S106, in response to determining to start to run an additional instance of the application, replicate the running state of all threads of the root instance as the running state of all threads of the additional instance. On the basis of the replicated running state of all threads, at step S107, continue to run all threads of the instance of the application.

Compared with the implementation of multi-tenancy in which the JVM® is replicated in conventional systems, the above method replicates the running state of all threads of the root instance, the granularity of replication is smaller, and the replicated contents are less, so that more program running space is saved.

Figure 2:
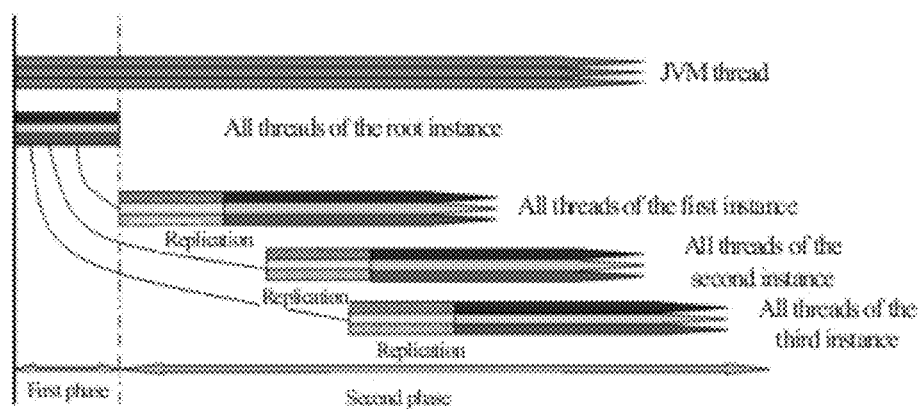
FIG. 2 further illustrates the example process of FIG. 1 for running a plurality of instances of an application by taking the Java™ programming language as an example according to an embodiment of the present subject matter.

FIG. 2 further illustrates the example process of FIG. 1 for running a plurality of instances of an application by taking the Java™ programming language as an example. It should be understood that although the method is described by taking the Java™ programming language as an example, it may be substituted with any other application using an object-oriented language and running on a virtual machine. In FIG. 2, the entire application is as a process and runs on the Java™ virtual machine (JVM®), and the JVM® per se may include many threads. The JVM® thread of FIG. 2 is an example, indicating a running environment of the following application. The application is under the multi-tenancy architecture, and according to the above method, the running on the Java™ virtual machine may be divided into two phases. The first phase is the running of the root instance. In the second phase the root instance may be used as a replication basis for running all threads of other instances.

According to FIG. 2, assume an instance includes three threads, and first run the root instance. Generally, an instance of an application is usually run from a main thread. The main thread may create more threads (i.e., child threads), while the child threads may create their own child threads. The creation of these threads is controlled by the code written by programmers. When running to a certain extent, stop running all threads of the root instance, which is called a freezing point herein. The way of setting the freezing point may be invoking a special instruction or function provided by the virtual machine. Usually, one program only needs to set one freezing point, which will be executed only once. When a thread of the program first runs to the freezing point, the virtual machine will receive the invoking of the special instruction or function, and then immediately start to execute the freezing operation (i.e., suspending the running of all threads of the application). The freezing point is usually set by a programmer according to their understanding of the program during writing the program, and is within the program. Therefore, programs with the same functions written by different programmers may save different storage space due to different positions of the freezing point. With the development of technology and artificial intelligence technology developing to a certain degree, the freezing point may be set automatically by programming tools. When automatically setting the freezing point, the following principles may be used: at the freezing point, the number of local handles opened by all threads of the root instance is the minimum, and the number of active threads of the instance is the minimum. Here the local handles include file handles, network handles, etc. When the root instance runs to the freezing point, all of its threads no longer run, and at this time, an attribute of a root instance object in the root instance may preferably be marked as read only, and then the running state of all threads of the root instance may be used as a replication basis for running all threads of other instances in the second phase. There are many ways to mark a root instance object, such as using a flag bit, or using the manner of locking, etc. For example, when the flag bit is used and is zero (0), the attributes of all the objects in the root instance are read only, otherwise, the attributes may be readable and writable.

In the second phase, start to run all threads of other instances. For the running of all threads of a first instance, first the running state of all threads of the root instance is replicated as the running state of all threads of the instance. The running state of all threads is the data structure of all thread objects per se, including at least the current stack, the values of registers, and the current instruction of a thread. The current stack of a thread may include a lot of information, including at least the reference to an instance object, and the reference may be a pointer, which, when being initialized, points to a root instance object. In this way, the running environment and the data of the root instance are replicated over. It should be noted that, compared with replicating the running environment of an application, replicating the contents of the root instance has smaller granularity and less contents. In addition, this may further reduce the starting time of a new instance. Thus, when second and third instances start to run, the running state of all threads is still replicated from the root instance, and then they proceed to run.

During the running process of all threads of an instance, an access operation, including a read operation and a write operation, may be performed on a field of an object in a thread, and here a write operation is first considered.

Figure 3:
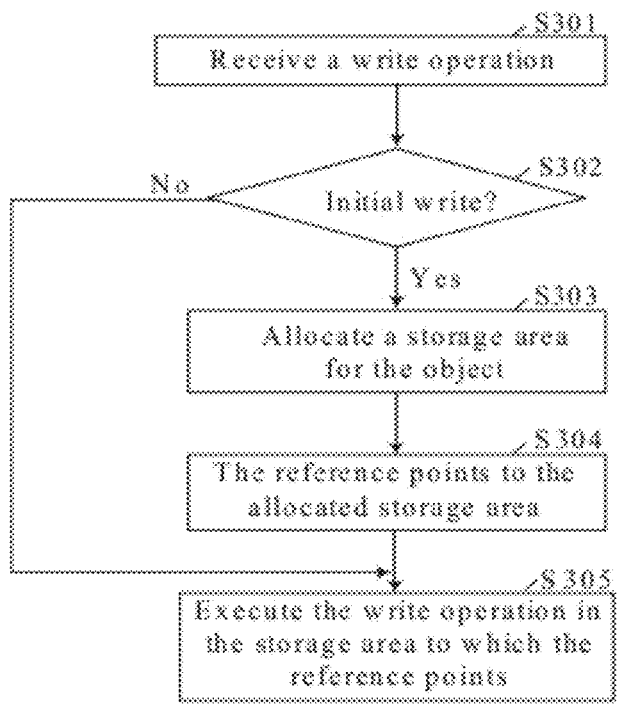
FIG. 3 is an example of an implementation of a process for an instance that performs a write operation according to an embodiment of the present subject matter.

FIG. 3 is an example of an implementation of a process for an instance that performs a write operation. According to FIG. 3, at step S301, receive a write operation to a field of an instance object of the application. At step S302, determine whether the write operation is an initial write operation to the instance object. Since before the initial write operation, the reference to the instance object in the current stack of the thread is initialized as pointing to a root instance object, if it is determined to be the initial write operation (i.e., in response to determining that the reference to the instance object points to a root instance object), at step S303, allocate a storage area for the instance object. At step S304, point the reference to the instance object included in the current stack to the storage area allocated for the instance object. At step S305, execute the write operate in the storage area. Here steps S303 and S305 are sequentially executed, while step S304 and steps S303 and S305 do not have a specific order relationship. Step S304 may be before, after, or between steps S303 and S305. If at step S302, it is determined that the write operation is not the initial write operation to the instance object, that is to say, the reference to the instance object included in the current stack is no longer pointed to a root instance object, but points to the storage area allocated for the instance object (i.e., in response to determining that the reference to the instance object does not point to a root instance object), jump to step S305 directly.

A read operation performed to a field of an object in the thread may directly access the area to which the reference to the instance object included in the current stack of the running state of all threads of the instance points. If no write operation has been performed, the value of the field of the root instance object is read. If a write operation has been performed, the value of the field of the object in the storage area allocated for the instance object is read.

As can be seen from the above solution, by using the above access operation, the storage space occupied by attributes of an instance object (i.e., data), is further reduced. When there is no data update, that is, no write operation to an attribute of an instance object happens, read operations are all directed to attributes of a root instance object, there is no need to replicate the attributes of instance objects, and the data storage space may also be further reduced.

Figure 4:
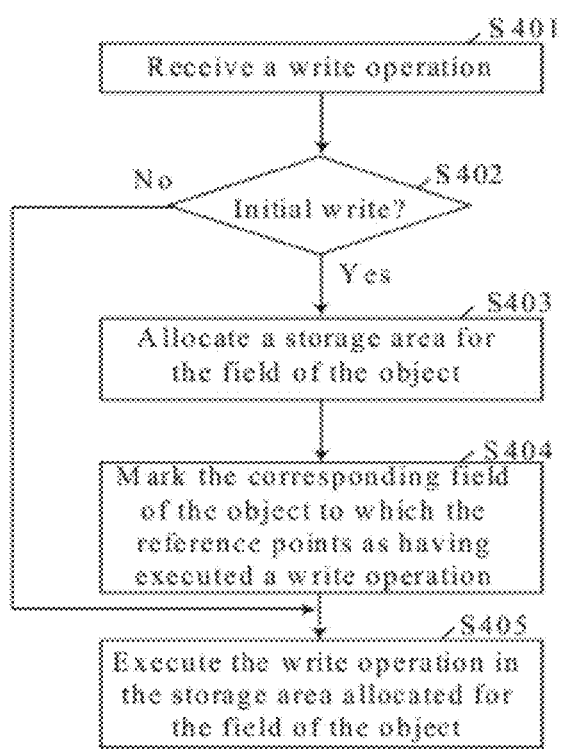
FIG. 4 is an example of an implementation of another process for an instance that performs a write operation according to an embodiment of the present subject matter.

FIG. 4 is an example of an implementation of another process for an instance that performs a write operation. According to FIG. 4, at step S401, receive a write operation to a field of an instance object. At step S402, determine whether a corresponding field of a root instance object to which the reference to the instance object points is marked as not yet having executed a write operation. In response to determining that a corresponding field of a root instance object to which the reference to the instance object points is marked as not yet having executed a write operation, allocate a storage area for the field of the instance object related to the write operation at step S403. As such, this processing does not allocate a storage area for an entire object as the implementation shown in FIG. 3, and allocates a storage area for the individual field that needs to be modified in the object. The field in the object is only a small portion of the object, and the occupied storage space is far smaller than the storage space occupied by the object, and thus, this may further save the data storage space of the instance. At step S404, mark the corresponding field of the root instance object to which the reference to the instance object points as having executed a write operation. At step S405, execute the write operation in the allocated storage area. Such marking may use various manners (e.g., using different values of a variable to denote different meanings) or using the virtual machine to mark, etc. Here, steps S403 and S405 are sequentially executed, while step S404 and steps S403 and S405 do not have a specific order relationship, and step S404 may be before, after, or between steps S403 and S405. When at step S402 it is determined that the corresponding field of the root instance object to which the reference to the instance object points is marked as having executed a write operation, that is to say, the field of the instance object related to the write operation has been allocated a storage area, then at this time, in response to determining that the corresponding field of the root instance object to which the reference to the instance object points is marked as having executed a write operation, execute the write operation in the storage area allocated for the field of the instance object related to the write operation at step S405.

A read operation performed to a field of an object in the thread may directly access the area to which the reference to the instance object included in the current stack of the running state of the thread of the instance points. If no write operation has been performed, the value of the field of the root instance object is read. If a write operation has been performed, the field of the instance object would have been marked, and such information recorded in the virtual machine may be used to read out the value of the field of the object in the storage area allocated for the field of the instance object.

As such, this example implementation not only further saves the data storage space of an instance, but also reserves all the advantages of the example implementation of FIG. 3.

When the application stops running, not only the running of all the other instances is stopped to release the program running space and data storage space occupied by all the instances, but the program running space and data storage space occupied by the root instance are also released.

Under the same inventive concept, the present subject matter also provides a system of running a plurality of instances of an application.

Figure 5:
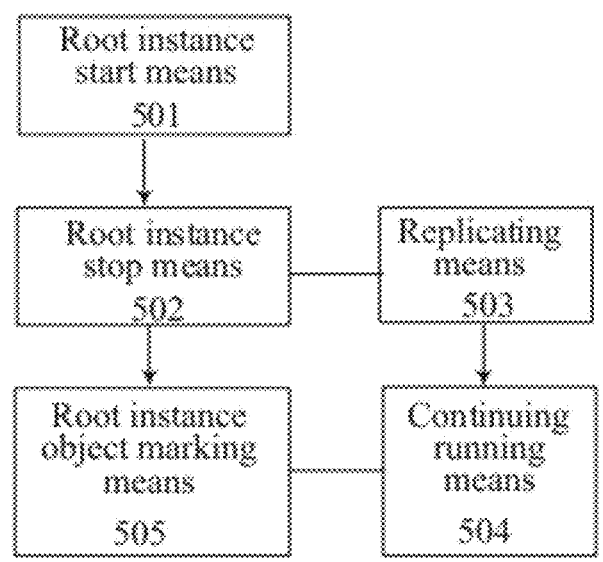
FIG. 5 schematically illustrates a structural block diagram of an example of an instance of a system for running a plurality of instances of an application according to an embodiment of the present subject matter.

FIG. 5 schematically shows a structural block diagram of an example of an instance of a system for running a plurality of instances of an application. As shown in FIG. 5, the system comprises a root instance start means 501 configured to start to run a root instance of the application, the root instance including at least one thread. A root instance stopping means 502 is configured to, in response to determining that a thread of the root instance runs to a preset freezing point in the application, stop running all threads of the root instance. A replicating means 503 is configured to, in response to starting to run an instance of the application, replicate the running state of all threads of the root instance as the running state of all threads of the instance. A continuing running means 504 is configured to continue to run all threads of the instance of the application. In a preferred embodiment, the system further comprises a root instance object marking means 505 configured to, in response to determining that a thread of the root instance runs to a preset freezing point in the application, mark an attribute of a root instance object in the root instance as read only. In the system, the running state of the thread includes at least the current stack, the values of registers and the current instruction of the thread. The current stack of the running state of a thread of the system instance includes a reference to an instance object, the reference to the object instance being initialized as pointing to the root instance object.

In an implementation, the continuing running means 504 further comprises: a write operation receiving means configured to receive a write operation to a field of an instance object; a storage allocation means configured to, in response to determining that the reference to the instance object received by the write operation receiving means points to a root instance object, allocate a storage area for the instance object; a reference modification means configured to, in response to determining that the reference to the instance object received by the write operation receiving means points to a root instance object, point the reference to the instance object to the storage area allocated by the storage area allocation means; a write operation execution means configured to, in response to determining that the reference to the instance object received by the write operation receiving means points to a root instance object, execute the write operation in the storage area allocated by the storage area allocation means. Therein, the write operation execution means is further configured to, in response to determining that the reference to the instance object received by the write operation receiving means does not point to the root instance object, execute the write operation in the storage area allocated by the storage area allocation means.

In another implementation, the continuing running means 504 further comprises: a write operation receiving means configured to receive a write operation to a field of an instance object; a marking means configured to, in response to determining that the corresponding field of the root instance object to which the reference to the instance object received by the write operation receiving means points is marked as having not executed a write operation yet, mark the corresponding field of the root instance object as having executed a write operation; a storage area allocation means configured to, in response to determining that the corresponding field of the root instance object to which the reference to the instance object received by the write operation receiving means points is marked as not having executed a write operation yet, allocate a storage area for the field of the instance object; a write operation execution means configured to, in response to determining that the corresponding field of the root instance object to which the reference to the instance object received by the write operation receiving means points is marked as having not executed a write operation yet, executing the write operation in the storage area allocated by the storage area allocation means. In the system, the write operation execution means is further configured to, in response to determining that the corresponding field of the root instance object to which the reference to the instance object received by the write operation receiving means points is marked as having executed a write operation, execute the write operation in the storage area allocated by the storage area allocation means.

Although here are described the example embodiments of the present subject matter with reference to the accompanying drawings, it should be appreciated that the present technology is not limited to these precise embodiments. Those of ordinary skill in the art may make various changes and modifications to the embodiments without departing from the scope and objectives of the present invention. All these changes and modifications are intended to be within the scope of the present invention defined by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for running a plurality of instances of an application, comprising:
    starting to run a root instance of the application, the root instance comprising at least one thread;
    in response to determining that a thread of the root instance runs to a preset freezing point in the application, stopping running all threads of the root instance;
    starting to run an additional instance of the application within a same virtual machine as the root instance of the application;
    in response to starting to run the additional instance of the application, replicating a running state of all threads of the root instance as a running state of all threads of the additional instance of the application; and
    continuing to run all threads of the additional instance of the application.

2. The method of claim 1, where the running state comprises at least: a current stack, values of registers, and a current instruction of a thread.

3. The method of claim 2, where the current stack of the running state comprises a reference to an instance object in the additional instance, the reference to the instance object being initialized as pointing to a root instance object in the root instance.

4. The method of claim 3, where the continuing to run all threads of the additional instance of the application comprises:
    receiving a write operation to a field of the instance object;
    in response to determining that the reference to the instance object points to the root instance object:
        allocating a storage area for the additional instance object;
        pointing the reference to the instance object to the allocated storage area; and
        executing the write operation in the allocated storage area.

5. The method of claim 4, further comprising:
    in response to determining that the reference to the instance object does not point to the root instance object, executing the write operation in the allocated storage area to which the reference to the instance object points.

6. The method of claim 3, where the continuing to run all threads of the instance of the application comprises:
    receiving a write operation to a field of the instance object;
    in response to determining that a corresponding field of the root instance object to which the reference to the instance object points is marked as not yet having executed a write operation:
        allocating a storage area for the field of the instance object;
        marking the corresponding field of the root instance object as having executed the write operation; and
        executing the write operation in the allocated storage area.

7. The method of claim 6, further comprising:
    in response to determining that the corresponding field of the root instance object to which the reference to the instance object points is marked as having executed a write operation, executing the write operation in the storage area allocated for the field of the instance object related to the write operation.

8. The method of claim 1, further comprising:
    in response to determining that a thread of the root instance runs to a preset freezing point in the application, marking an attribute of a root instance object in the root instance as read only.

9. A system for running a plurality of instances of an application, comprising:
    a memory; and
    a processor programmed to:
        start to run a root instance of the application, the root instance comprising at least one thread;
        in response to determining that a thread of the root instance runs to a preset freezing point in the application, stop running all threads of the root instance;
        start to run an additional instance of the application within a same virtual machine as the root instance of the application;
        in response to start to run the additional instance of the application, replicate a running state of all threads of the root instance as a running state of all threads of the additional instance of the application; and
        continue to run all threads of the additional instance of the application.

10. The system of claim 9, where the running state comprises at least: a current stack, values of registers, and a current instruction of a thread.

11. The system of claim 10, where the current stack of the running state comprises a reference to an instance object in the additional instance, the reference to the instance object being initialized as pointing to a root instance object in the root instance.

12. The system of claim 11, where, in being programmed to continue to run all threads of the additional instance of the application, the processor is programmed to:

receive a write operation to a field of the instance object;
in response to determining that the reference to the instance object points to the root instance object:
   allocate a storage area for the additional instance object;
   point the reference to the instance object to the allocated storage area; and
   execute the write operation in the allocated storage area.

13. The system of claim 12, where the processor is further programmed to, in response to determining that the reference to the instance object does not point to the root instance object, execute the write operation in the allocated storage area to which the reference to the instance object points.

14. The system of claim 11, where, in being programmed to continue to run all threads of the additional instance of the application, the processor is programmed to:
receive a write operation to a field of the instance object;
in response to determining that a corresponding field of the root instance object to which the reference to the instance object points is marked as not yet having executed a write operation:
   allocate a storage area for the field of the instance object;
   mark the corresponding field of the root instance object as having executed the write operation; and
   execute the write operation in the allocated storage area.

15. The system of claim 14, where the processor is further programmed to, in response to determining that the corresponding field of the root instance object to which the reference to the instance object points is marked as having executed a write operation, execute the write operation in the storage area allocated for the field of the instance object related to the write operation.

16. The system of claim 9, where the processor is further programmed to:
in response to determining that a thread of the root instance runs to a preset freezing point in the application, mark an attribute of a root instance object in the root instance as read only.

17. A computer program product for running a plurality of instances of an application comprising a computer readable storage memory including computer readable program code, where the computer readable program code when executed on a computer causes the computer to:
start to run a root instance of the application, the root instance comprising at least one thread;
in response to determining that a thread of the root instance runs to a preset freezing point in the application, stop running all threads of the root instance;
start to run an additional instance of the application within a same virtual machine as the root instance of the application;
in response to starting to run the additional instance of the application, replicate a running state of all threads of the root instance as a running state of all threads of the additional instance of the application; and
continue to run all threads of the additional instance of the application.

18. The computer program product of claim 17, where the running state comprises at least: a current stack, values of registers, and a current instruction of a thread.

19. The computer program product of claim 18, where the current stack of the running state comprises a reference to an instance object in the additional instance, the reference to the instance object being initialized as pointing to a root instance object in the root instance.

20. The computer program product of claim 19, where, in causing the computer to continue to run all threads of the additional instance of the application, the computer readable program code when executed on the computer causes the computer to:
receive a write operation to a field of the instance object;
in response to determining that the reference to the instance object points to the root instance object:
   allocate a storage area for the additional instance object;
   point the reference to the instance object to the allocated storage area; and
   execute the write operation in the allocated storage area.

21. The computer program product of claim 20, where the computer readable program code when executed on the computer further causes the computer to:
in response to determining that the reference to the instance object does not point to the root instance object, execute the write operation in the allocated storage area to which the reference to the instance object points.

22. The computer program product of claim 19, where, in causing the computer to continue to run all threads of the instance of the application, the computer readable program code when executed on the computer causes the computer to:
receive a write operation to a field of the instance object;
in response to determining that a corresponding field of the root instance object to which the reference to the instance object points is marked as not yet having executed a write operation:
   allocate a storage area for the field of the instance object;
   mark the corresponding field of the root instance object as having executed the write operation; and
   execute the write operation in the allocated storage area.

23. The computer program product of claim 22, where the computer readable program code when executed on the computer further causes the computer to:
in response to determining that the corresponding field of the root instance object to which the reference to the instance object points is marked as having executed a write operation, execute the write operation in the storage area allocated for the field of the instance object related to the write operation.

24. The computer program product of claim 17, where the computer readable program code when executed on the computer further causes the computer to:
in response to determining that a thread of the root instance runs to a preset freezing point in the application, mark an attribute of a root instance object in the root instance as read only.

* * * * *